United States Patent
Sakima et al.

(10) Patent No.: US 7,857,505 B2
(45) Date of Patent: Dec. 28, 2010

(54) METHOD AND CIRCUIT FOR CORRECTING SENSOR TEMPERATURE DEPENDENCY CHARACTERISTIC

(75) Inventors: Hiroyuki Sakima, Kasugai (JP); Koju Aoki, Kasugai (JP); Takahiro Watai, Kasugai (JP); Masaya Mizutani, Kasugai (JP); Takuya Okajima, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1047 days.

(21) Appl. No.: 11/598,571

(22) Filed: Nov. 14, 2006

(65) Prior Publication Data

US 2007/0214884 A1    Sep. 20, 2007

(30) Foreign Application Priority Data

Mar. 16, 2006    (JP) .............................. 2006-072659

(51) Int. Cl.
    *G01K 15/00*    (2006.01)
    *G01K 11/00*    (2006.01)
(52) U.S. Cl. ............................ 374/1; 374/112; 374/166
(58) Field of Classification Search ...................... 374/1, 374/166, 112
    See application file for complete search history.

(56) References Cited

U.S. PATENT DOCUMENTS

| 7,625,118 | B2* | 12/2009 | Mizuno ....................... 374/111 |
| 2004/0088134 | A1* | 5/2004 | Gauthier et al. ............. 702/132 |
| 2007/0229120 | A1* | 10/2007 | Okajima et al. ............. 327/100 |
| 2008/0232425 | A1* | 9/2008 | Hall et al. ....................... 374/1 |

FOREIGN PATENT DOCUMENTS

| JP | 11-064123 A | 3/1999 |
| JP | 11-194061 A | 7/1999 |
| JP | 2001-143183 A | 5/2001 |
| JP | 2003-084728 A | 3/2003 |

* cited by examiner

*Primary Examiner*—Lisa M Caputo
*Assistant Examiner*—Mirellys Jagan
(74) *Attorney, Agent, or Firm*—Fujitsu Patent Center (57) ABSTRACT

A method and circuit for preventing an output signal, which has been corrected through digital correction or analog correction, from deviating from a target value and for preventing power supply noise and power consumption from increasing. A sensor amplification circuit receives output of a sensor as an input signal. Correction points are set at predetermined temperature intervals. The sensor amplification circuit performs digital correction for correcting the input signal with correction data set for each correction point. Further, the sensor amplification circuit performs a second correction for correcting the input signal between the correction points with gradient data calculated from the correction data for two of the correction points that are adjacent to each other.

11 Claims, 11 Drawing Sheets

| Correction Point | Temperature (°C) | Correction Data | |
|---|---|---|---|
| P1 | -30 | +4.0 | ~D0 |
| P2 | -20 | +4.0 | ~D1 |
| P3 | -10 | +4.0 | ~D2 |
| P4 | 0 | +4.0 | ~D3 |
| P5 | 10 | +3.5 | ~D4 |
| P6 | 20 | +3.0 | ~D5 |
| P7 | 30 | +2.0 | ~D6 |
| P8 | 40 | +1.0 | ~D7 |
| P9 | 50 | -2.0 | ~D8 |
| P10 | 60 | -7.0 | ~D9 |

Fig.10

| Gradient Data Generation Range | Gradient Data | |
|---|---|---|
| P1→P2 | 0.0 | ~S0 |
| P2→P3 | 0.0 | ~S1 |
| P3→P4 | 0.0 | ~S2 |
| P4→P5 | 0.5 | ~S3 |
| P5→P6 | 0.5 | ~S4 |
| P6→P7 | 1.0 | ~S5 |
| P7→P8 | 1.0 | ~S6 |
| P8→P9 | 3.0 | ~S7 |
| P9→P10 | 5.0 | ~S8 |

| Correction Point | Temperature (°C) | Correction Data | |
|---|---|---|---|
| P1 | -30 | +4.0 | ~D0a |
| P2 | 0 | +4.0 | ~D1a |
| P3 | 20 | +3.0 | ~D2a |
| P4 | 30 | +2.0 | ~D3a |
| P5 | 40 | +1.0 | ~D4a |
| P6 | 45 | +0.0 | ~D5a |
| P7 | 50 | -2.0 | ~D6a |
| P8 | 53 | -3.0 | ~D7a |
| P9 | 56 | -5.0 | ~D8a |
| P10 | 60 | -7.0 | ~D9a |

Fig.13

| Gradient Data Generation Range | Gradient Data | |
|---|---|---|
| P1→P2 | 0.0 | ~S0a |
| P2→P3 | 0.5 | ~S1a |
| P3→P4 | 1.0 | ~S2a |
| P4→P5 | 1.0 | ~S3a |
| P5→P6 | 3.0 | ~S4a |
| P6→P7 | 4.0 | ~S5a |
| P7→P8 | 4.0 | ~S6a |
| P8→P9 | 4.0 | ~S7a |
| P9→P10 | 4.0 | ~S8a |

| Correction Point | Temperature (°C) | Correction Data | Determination Result |
|---|---|---|---|
| P1 | -30 | +4.0 | |
| P2 | -20 | +4.0 | Digital Correction, Analog Correction Unnecessary |
| P3 | -10 | +4.0 | Digital Correction, Analog Correction Unnecessary |
| P4 | 0 | +4.0 | Digital Correction Unnecessary |
| P5 | 10 | +3.5 | Analog Correction Unnecessary |
| P6 | 20 | +3.0 | |
| P7 | 30 | +2.0 | Analog Correction Unnecessary |
| P8 | 40 | +1.0 | |
| P9 | 50 | -2.0 | |
| P10 | 60 | -7.0 | |

Fig.17

METHOD AND CIRCUIT FOR CORRECTING SENSOR TEMPERATURE DEPENDENCY CHARACTERISTIC

CROSS-REFERENCE TO RELATED APPLICATIONS

This application is based upon and claims the benefit of priority from the prior Japanese Patent Application No. 2006-072659, filed on Mar. 16, 2006, the entire contents of which are incorporated herein by reference.

BACKGROUND OF THE INVENTION

The present invention relates to a method and circuit for correcting an output signal of a sensor, such as an angular velocity sensor or an acceleration sensor.

Sensors have been miniaturized over recent years and have finer output signals. Such a sensor requires an amplification circuit for detecting and amplifying sensor output. Output signals from the sensor and the amplification circuit are dependent on temperature. Thus, the amplification circuit is required to correct such temperature dependent characteristics. Accordingly, there is a need for performing such a correction process accurately and easily.

In the prior art, a digital correction process and an analog correction process have been employed by sensor amplification circuits to correct the temperature dependent characteristic of a sensor output. The digital correction process uses correction data prestored for every predetermined temperature step in a storage means. The amplification circuit reads correction data corresponding to an ambient temperature from the storage means and generates an output signal by correcting the sensor output based on the correction data.

In the analog correction process, when the temperature dependent characteristic of the sensor output has a predetermined gradient, a gradient is set for the temperature characteristic of the amplification circuit to offset the predetermined gradient of the sensor output. When the sensor output changes along a curve with respect to temperature changes, the sensor output is approximated with a plurality of straight lines to switch the gradient of the temperature dependent characteristic of the amplification circuit in accordance with the temperature. In this way, the amplification circuit corrects the sensor output to generate the output signal.

Figure 1:
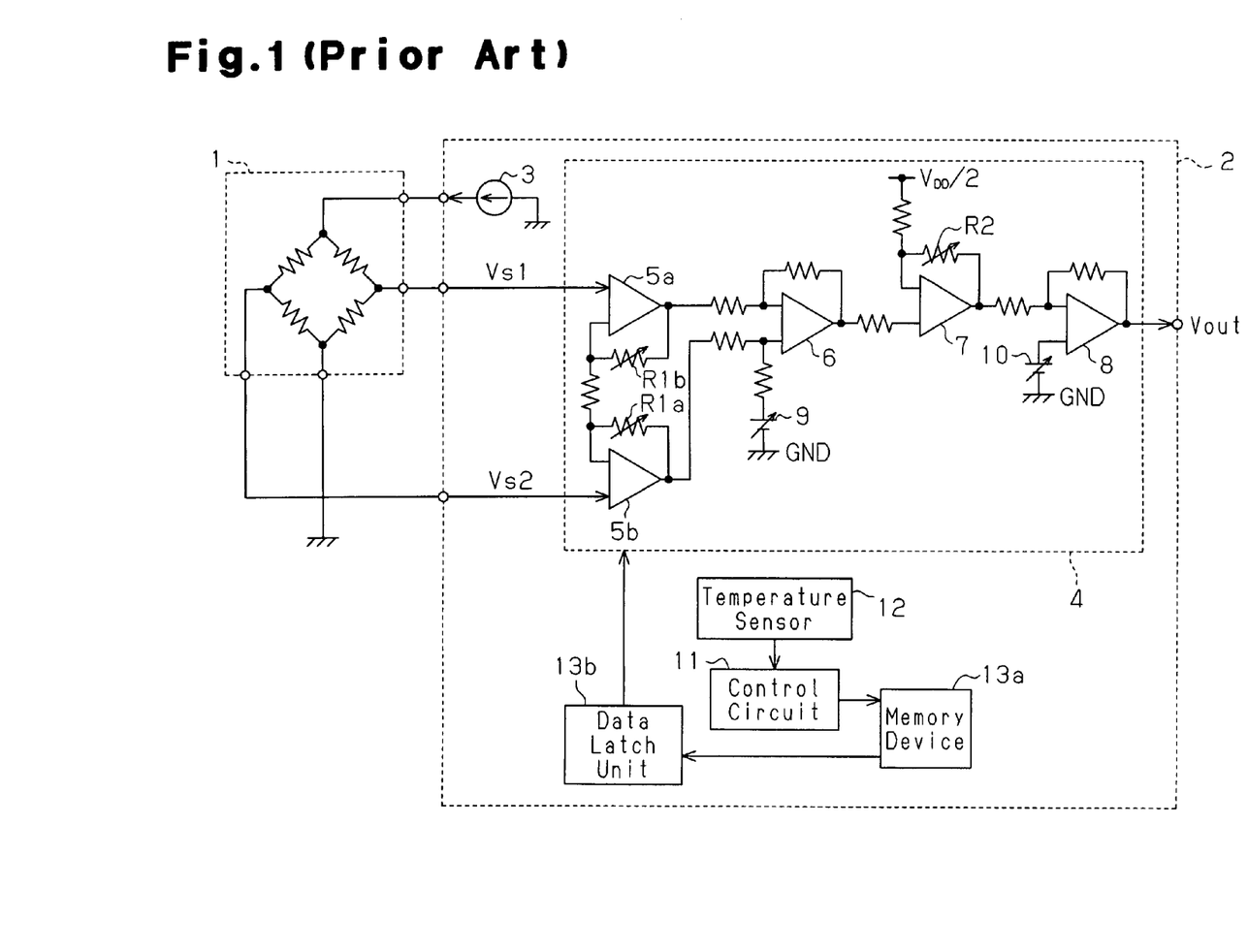
FIG. 1 is a schematic circuit diagram showing a sensor amplification circuit including a digital correction function in the prior art.

FIG. 1 is a schematic block circuit diagram of a conventional sensor amplification circuit 2 including a digital correction function. The amplification circuit 2 is formed by an IC chip and connected to a bridge type sensor 1. The amplification circuit 2 includes an amplification circuit unit 4 for amplifying the output of the sensor 1 and generating an output signal Vout. The amplification circuit unit 4 includes a digital correction function for correcting the output of the sensor 1 in a digital manner. The sensor 1 is supplied with constant current from a current source 3 in the amplification circuit 2. Output voltages Vs1 and Vs2 of the sensor 1 are supplied to the amplification circuit unit 4.

The amplification circuit unit 4 includes input-stage amplifiers 5a and 5b for receiving the output voltages Vs1 and Vs2 of the sensor 1, an amplifier 6 for amplifying the difference between output voltages of the input-stage amplifiers 5a and 5b, an amplifier 7 for amplifying an output signal of the amplifier 6, and an output-stage amplifier 8 for amplifying an output voltage of the amplifier 7.

The input-stage amplifiers 5a and 5b is respectively connected to the feedback resistors R1a and R1b, which are variable resistors. The resistances of the feedback resistors R1a and R1b are adjusted to adjust the gain of the amplification circuit unit 4. The amplifier 6 includes two input terminals, one of which is connected to ground GND via a voltage adjustment circuit 9. The voltage adjustment circuit 9 has a voltage that is adjusted to adjust the offset voltage of the amplification circuit unit 4.

The amplifier 7 is connected to a feedback resistor R2, which is a variable resistor. The resistance of the feedback resistor R2 is adjusted to adjust the gain of the amplification circuit unit 4. The output-stage amplifier 8 includes two input terminals, one of which is connected to ground GND via a voltage adjustment circuit 10. The voltage adjustment circuit 10 has a voltage that is adjusted to adjust the offset voltage of the amplification circuit unit 4.

Each of the resistors R1a, R1b, and R2 includes a plurality of resistors connected in series and a plurality of switches respectively connected in parallel to the resistors. The switches for each of the resistors R1a, R1b, and R2 are controlled to adjust the resistance of each of the resistors R1a, R1b, and R2 in steps. Each of the voltage adjustment circuits 9 and 10 includes a plurality of resistors connected in series and a plurality of switches respectively connected in parallel to the resistors. The switches for each of the voltage adjustment circuits 9 and 10 are controlled to adjust the voltage in steps for each of the voltage adjustment circuits 9 and 10.

The amplification circuit unit 4 digitally corrects the temperature characteristic of the sensor 1 in accordance with the operation of a control circuit 11. The amplification circuit unit 4 amplifies the output of the sensor 1 to generate an output signal Vout, which is not dependent on the temperature.

The control circuit 11 is connected to a temperature sensor 12 and a memory device 13a. The temperature sensor 12 detects the ambient temperature. The memory device 13a prestores correction data for adjusting the resistances of the resistors R1a, R1b, and R2 and the voltage adjustment circuits 9 and 10 in accordance with the temperature detected by the temperature sensor 12. The control circuit 11 reads correction data corresponding to the ambient temperature from the memory device 13a based on a detection signal from the temperature sensor 12. The memory device 13a converts the correction data into control data and stores the control data in a data latch unit 13b. The resistances of the resistors R1a, R1b, and R2 and the voltage adjustment circuits 9 and 10 are adjusted based on the control data stored in the data latch unit 13b.

Figure 2:
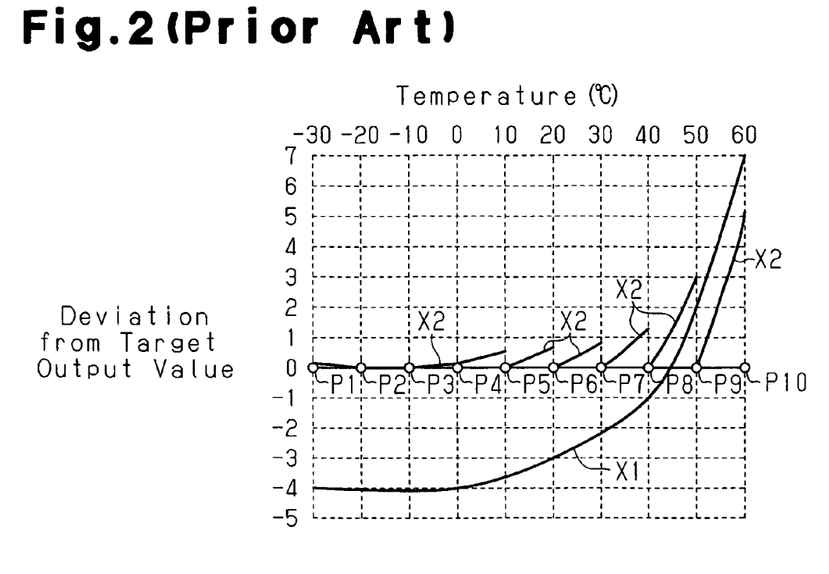
FIG. 2 is a schematic graph showing the output characteristic of the prior art sensor amplification circuit.

FIG. 2 is a graph schematically showing the output characteristic of the sensor amplification circuit 2. Characteristic curve X1 indicates the output characteristic of the amplification circuit unit 4 when digital correction is not performed. As shown in FIG. 2, the characteristic curve X1 increases as the temperature increases. However, it is preferable that the characteristic curve X1 be corrected in a manner that the temperature characteristic is flat at a predetermined target value (zero level in FIG. 2) regardless of the temperature.

Characteristic curve X2 indicates the output characteristic of the amplification circuit unit 4 after digital correction. As the characteristic curve X2 of FIG. 2 shows, the resistances of the resistors R1a, R1b, and R2 and the voltage adjustment circuits 9 and 10 are adjusted in intervals of 10° C. at correction points P1 to P10.

As shown in FIG. 2, the characteristic curve X2 indicates that the level of the output signal converges on its target value at each of the correction points P1 to P10. However, the characteristic curve X2 deviates from the target value in the temperatures between the correction points P1 to P10 in accordance with the temperature dependent characteristic expressed by the characteristic curve X1. Thus, the characteristic curve X2 is plotted in a sawtooth-like manner depending on the temperature. As a result, the characteristic curve X2 is still temperature dependent and not flat.

Figure 3:
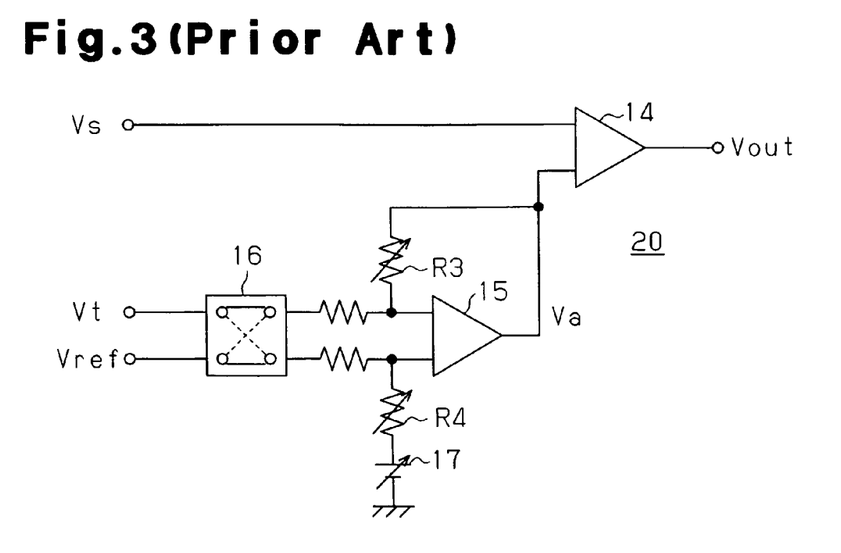
FIG. 3 is a schematic block circuit diagram showing a sensor amplification circuit including an analog correction function in the prior art.

FIG. 3 is a schematic circuit diagram of a conventional sensor amplification circuit 20 including an analog correction function. An output-stage amplifier 14 includes two input terminals, one of which is supplied with output voltage Vs of a sensor and the other of which is supplied with output voltage Va of an analog correction amplifier 15.

Figure 4A:
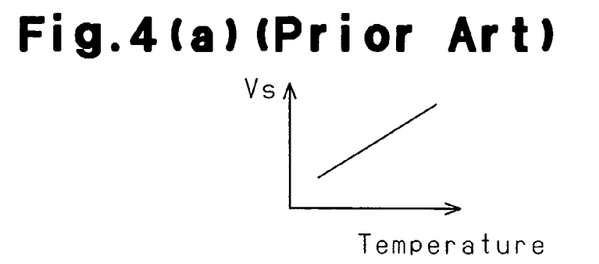
FIG. 4(a) is a graph showing the relationship between the temperature and the output voltage of the sensor shown in FIG. 3.
Figure 4B:
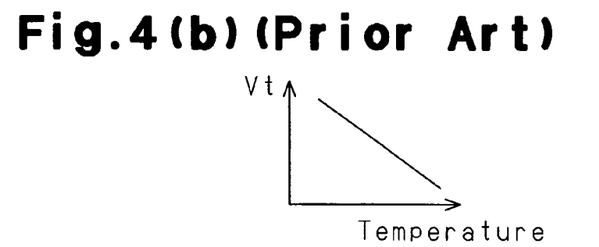
FIG. 4(b) is a graph schematically showing the relationship between the temperature and temperature dependent voltage, which is supplied to the analog correction amplifier shown in FIG. 3.
Figure 4C:
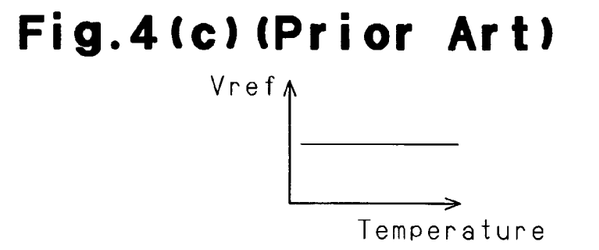
FIG. 4(c) is a graph showing the relationship between the temperature and reference voltage in FIG. 3.

Temperature dependent voltage Vt, which is temperature dependent as shown in FIG. 4(b), and reference voltage Vref, which is not temperature dependent and constant as shown in FIG. 4(c), are respectively supplied to the two input terminals of the analog correction amplifier 15 via a switch circuit 16. The temperature dependent voltage Vt is generated by a forward voltage at a PN junction of a transistor or a diode. The temperature dependent voltage Vt changes linearly with respect to temperature changes at a gradient of, for example, −2 mV/° C. The reference voltage Vref is generated using a bandgap reference voltage.

The switch circuit 16 supplies the temperature dependent voltage Vt and the reference voltage Vref respectively to the two input terminals of the analog correction amplifier 15. If one of the input terminals of the amplifier 15 is supplied with the temperature dependent voltage Vt, the other one of the input terminals of the amplifier is supplied with the reference voltage Vref. If one of the input terminals of the amplifier 15 is supplied with the reference voltage Vref, the other one of the input terminals of the amplifier is supplied with the temperature dependent voltage Vt.

A feedback resistor R3, which is a variable resistor, is connected between the one of the input terminals and an output terminal of the analog correction amplifier 15. A variable resistor R4 and a voltage adjustment circuit 17 are connected in series between the other one of the input terminals of the analog correction amplifier 15 and ground GND.

The resistors R3 and R4 and the voltage adjustment circuit 17 are each configured in a manner similar to the resistors R1a, R1b, and R2 and the voltage adjustment circuits 9 and 10 shown in FIG. 1. Accordingly, the resistances of the resistors R3 and R4 and the voltage of the voltage adjustment circuit 17 are adjusted in steps.

Figure 4D:
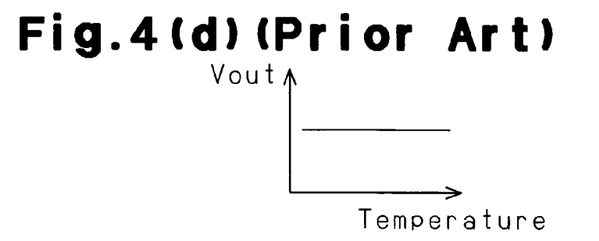
FIG. 4(d) is a graph schematically showing the relationship between the temperature and output voltage of the output-stage amplifier shown in FIG. 3.
Figure 4E:
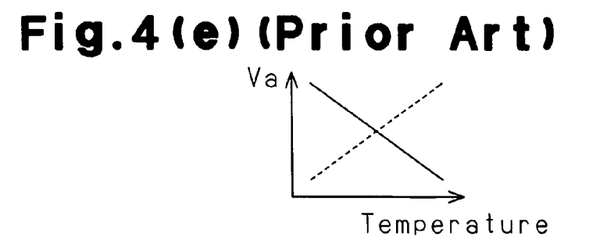
FIG. 4(e) is a graph schematically showing the relationship between the temperature and the output voltage of the analog correction amplifier shown in FIG. 3.

The output voltage Va of the analog correction amplifier 15 changes linearly based on changes in the ambient temperature as shown in FIG. 4(e). In accordance with changes in the ambient temperature, the switch circuit 16 switches the output voltage Va between the gradient of the solid line shown in FIG. 4 (e) and the gradient of the broken line shown in FIG. 4(e). The gradient of the output voltage Va is changed by adjusting the resistances of the resistors R3 and R4. Further, the offset voltage of the output signal Vout of the output-stage amplifier 14 is changed by adjusting the voltage value of the voltage adjustment circuit 17.

As shown in FIG. 4(a), when the output voltage Vs of the sensor 1 changes linearly with respect to the ambient temperature, the gradient of the output voltage Va of the analog correction amplifier 15 is set to offset the gradient of the output voltage Vs of the sensor 1. As a result, the output signal Vout that is not temperature dependent as shown in FIG. 4(d) is output from the output-stage amplifier 14.

Figure 5:
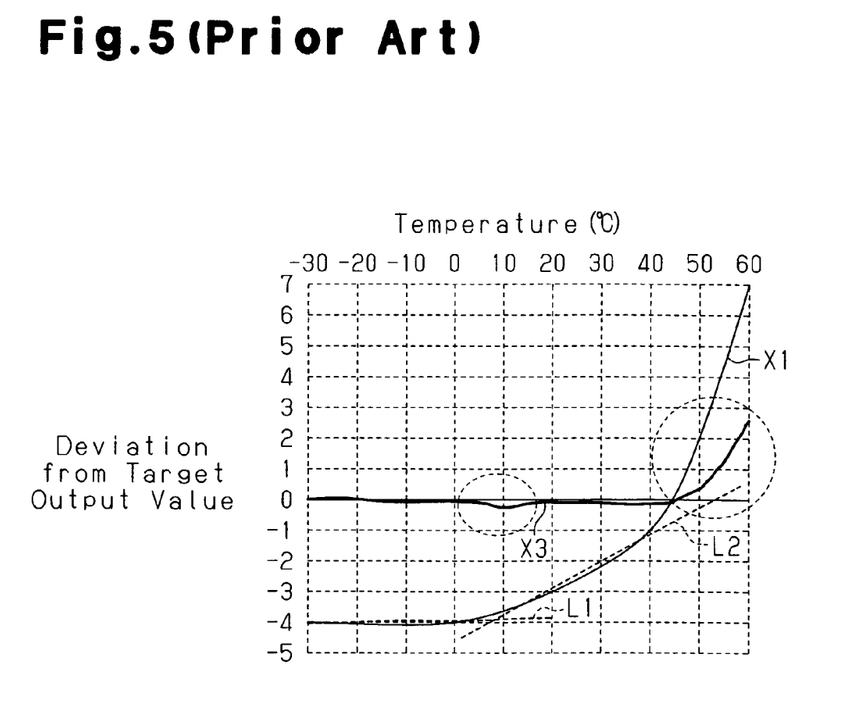
FIG. 5 is a graph schematically showing the output characteristic of the sensor amplification circuit of FIG. 3.

FIG. 5 is a graph schematically showing the output characteristic of the sensor amplification circuit 20 shown in FIG. 3. Characteristic curve X1 shows the output characteristic of the amplifier 14 when analog correction is not performed. The amplification circuit 20 approximates the characteristic curve X1 from two straight lines L1 and L2 and switches the resistances of the resistors R3 and R4 and the voltage adjustment circuit 17 so as to offset the gradients and the offset values of the straight lines L1 and L2. For example, the resistances of the resistors R3 and R4 are switched at 10° C. to switch from the approximate straight line L1 to the approximate straight line L2.

In FIG. 5, the characteristic curve X3 is substantially converged to the target value (level represented by zero in FIG. 5) at temperatures in which the characteristic curve X1 coincides with the approximate straight lines L1 and L2. However, the characteristic curve X3 deviates from the target value in the vicinity of 10° C. at which the switching between the approximate straight lines L1 and L2 occurs. Accordingly, a flat temperature characteristic cannot be obtained.

Japanese Laid-Open Patent Publication No. 2003-84728 describes a voltage generation circuit that includes a circuit for performing temperature compensation through analog control and a circuit for performing temperature compensation through digital control. The voltage generation circuit switches between analog control and digital control in accordance with the temperature region.

Japanese Laid-Open Patent Publication No. 11-64123 describes a bridge circuit that includes a compensation resistor for performing rough compensation for an output that changes in accordance with the temperature and a compensation unit for performing fine compensation for that output.

Japanese Laid-Open Patent Publication No. 11-194061 describes a sensor drive circuit for performing temperature compensation in a sensor drive circuit with a digital compensation means.

Japanese Laid-Open Patent Publication No. 2001-143183 describes a structure similar to the analog correction amplifier 15 shown in FIG. 3.

SUMMARY OF THE INVENTION

The characteristic curve X2 digitally corrected by the sensor amplification circuit 2 shown in FIGS. 1 and 2 converges on the target value at the correction points P1 to P10 that are set at intervals of 10° C. but deviates from the target value between the correction points P1 to P10. Thus, the characteristic curve X2 changes in a sawtooth-like manner depending on the temperature. As a result, the characteristic curve X2 cannot show a flat temperature characteristic.

The deviations from the target value may be reduced by increasing the correction points. However, an increase in the number of correction points increases the amount of data stored in the memory device 13a. This enlarges the memory device 13a. Further, the number of times for reading correction data corresponding to each temperature from the memory device 13a increases, and the number of times the resistances are changed in the sensor amplification circuit 2 increases. This increases power supply noise and power consumption of the sensor amplification circuit 2.

The characteristic curve X3 obtained through analog correction by the sensor amplification circuit 20 shown in FIGS. 3 and 5 deviates from the target value at temperatures region in which the characteristic curve X1 deviates from the approximate straight lines L1 and L2. The deviations from the target value may be reduced by increasing approximate lines. However, an increase in the number of approximate straight lines increases the number of times the resistances of the resistors R3 and R4 are changed to switch the approximate straight line gradient. This increases power supply noise and power consumption.

The above publications all fail to describe devices that reduce deviations of an amplification circuit output signal from a target value while preventing power supply noise and power consumption from increasing.

The present invention provides a method and circuit for preventing an output signal, which has been corrected through digital correction and analog correction, from being deviated from a target value, while preventing power supply noise and power consumption from increasing.

One aspect of the present invention is a method for correcting an input signal having a temperature dependent characteristic. The method includes setting correction data for each of a plurality of correction points set at a predetermined temperature interval, performing a first correction for correcting the input signal with the correction data, calculating gradient data between two of the correction points that are adjacent to each other from the correction data for each of the two adjacent correction points, and performing a second correction for correcting the input signal with the gradient data.

Another aspect of the present invention is a correction circuit for correcting an input signal having a temperature dependent characteristic. The correction circuit includes a memory device for storing correction data for each of a plurality of correction points set at a predetermined temperature interval. A first correction circuit corrects the input signal at each correction point based on the correction data corresponding to each correction point. A second correction circuit corrects the input signal between two of the correction points that are adjacent to each other based on gradient data calculated from the correction data for each of the two adjacent correction points. A sensor detects the temperature. A control circuit reads the correction data corresponding to the temperature detected by the temperature sensor from the memory device and controlling operation of the first correction circuit and the second correction circuit based on the correction data.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

A sensor amplification circuit 21 according to a first embodiment of the present invention will now be described with reference to FIGS. 6 to 10.

Figure 6:
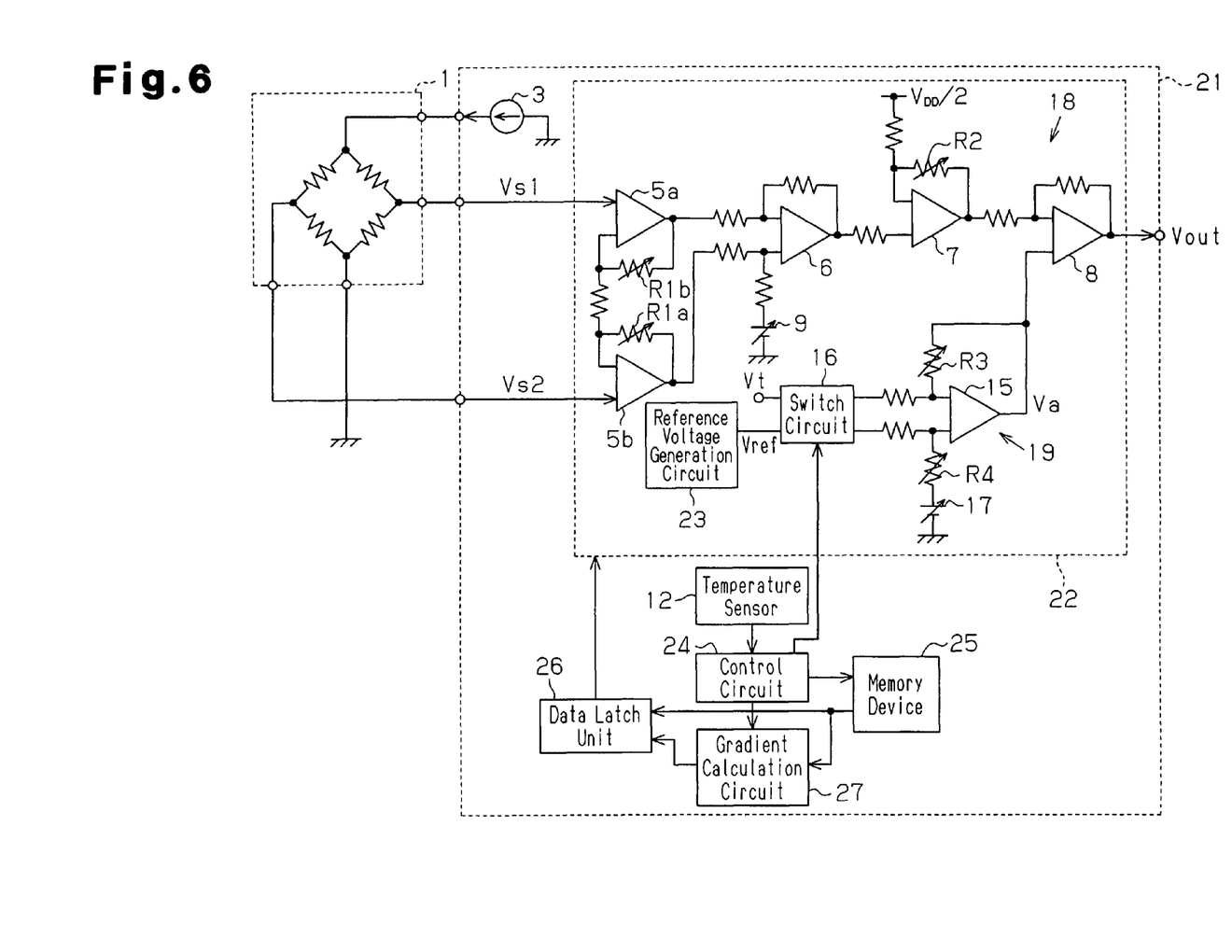
FIG. 6 is a schematic block circuit diagram showing a sensor amplification circuit according to a first embodiment of the present invention.

FIG. 6 is a schematic block circuit diagram showing the sensor amplification circuit 21. The amplification circuit 21, which is formed by an IC chip, is connected to a bridge type sensor 1. The amplification circuit 21 has an amplification circuit unit 22. The amplification circuit unit 22 includes a digital correction circuit 18 (first correction circuit) for performing digital correction on a temperature dependent characteristic of an output of the sensor 1 and an analog correction circuit 19 (second correction circuit) for performing analog correction on the temperature dependent characteristic of the output of the sensor 1. The digital correction circuit 18 includes 5a, 5b, 6, and 7, resistors R1a, R1b, and R2, and a voltage adjustment circuit 9. The analog correction circuit 19 includes an amplifier 15, a switch circuit 16, a voltage adjustment circuit 17, and resistors R3 and R4.

The bridge type sensor 1 is supplied with constant current from a current source 3 in the amplification circuit 21. Output voltages Vs1 and Vs2 of the sensor 1 are supplied to the amplification circuit unit 22 in the amplification circuit 21.

The amplification circuit unit 22 includes input-stage amplifiers 5a and 5b for respectively receiving the output voltages Vs1 and Vs2 of the sensor 1, an amplifier 6 for amplifying the difference between output voltages of the input-stage amplifiers 5a and 5b, an amplifier 7 for amplifying an output signal of the amplifier 6, and an output-stage amplifier 8 for amplifying an output voltage of the amplifier 7.

The amplifier 5b and 5a is respectively connected to the feedback resistors R1a and R1b, which are variable resistors. The resistances of the feedback resistors R1a and Rib are adjusted to adjust the gain of the amplification circuit unit 22. The amplifier 6 includes two input terminals, one of which is connected to ground GND via a voltage adjustment circuit 9. The voltage of the voltage adjustment circuit 9 is adjusted to adjust the offset voltage of the amplification circuit unit 22.

The amplifier 7 is connected to a feedback resistor R2, which is a variable resistor. The resistance of the feedback resistor R2 is adjusted to adjust the gain of the amplification circuit unit 22.

The amplifier 8 is supplied with an output signal of the amplifier 7 and an output voltage Va of an analog correction amplifier 15. The amplifier 8 generates an output signal Vout based on the input signals.

Figure 7:
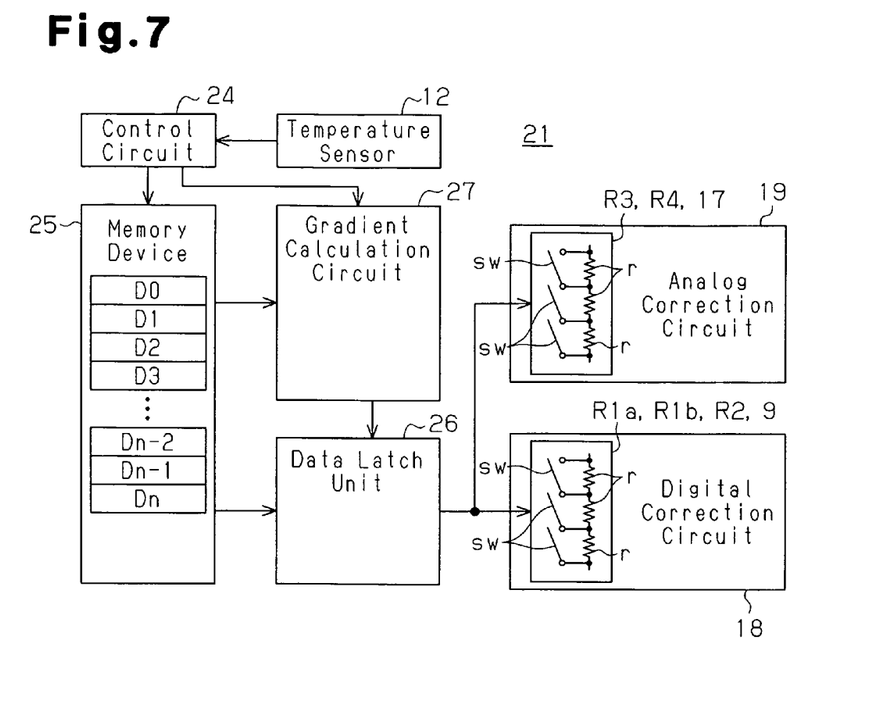
FIG. 7 is a schematic block circuit diagram showing part of the sensor amplification circuit of FIG. 6.

As shown in FIG. 7, each of the feedback resistors R1$a$, R1$b$, and R2 and the voltage adjustment circuit 9 includes a plurality of resistors r connected in series and a plurality of switches sw respectively connected in parallel to the resistors. Each of the switches sw is controlled to adjust in steps the resistance of each of the resistors R1$a$ and R1$b$ and the voltage of the voltage adjustment circuit 9.

Temperature dependent voltage Vt, which is dependent on the temperature, and a reference voltage Vref, which has a constant temperature regardless of the temperature, are respectively supplied to the two input terminals of the analog correction amplifier 15 via a switch circuit 16. The temperature dependent voltage Vt is generated from a forward voltage at a PN junction of a transistor or a diode. Further, the temperature dependent voltage Vt linearly changes with respect to temperature changes at a gradient of, for example, −2 mV/° C. The reference voltage Vref is generated by a reference voltage generation circuit 23 using, for example, a bandgap reference voltage.

The switch circuit 16 supplies the temperature dependent voltage Vt and the reference voltage Vref to the two input terminals of the analog correction amplifier 15. When one of the input terminals of the amplifier 15 is supplied with the temperature dependent voltage Vt, the other input terminal of the amplifier 15 is supplied with the reference voltage Vref. When one of the input terminals of the amplifier 15 is supplied with the reference voltage Vref, the other input terminal of the amplifier 15 is supplied with the temperature dependent voltage Vt.

A feedback resistor R3, which is a variable resistor, is connected between an output terminal and one of the input terminals of the analog correction amplifier 15. A variable resistor R4 and a voltage adjustment circuit 17 are connected in series between the other input terminal of the analog correction amplifier 15 and ground GND.

As shown in FIG. 7, each of the resistors R3 and R4 and the voltage adjustment circuit 17 includes a plurality of resistors r connected in series and a plurality of switches sw respectively connected in parallel to the resistors. Each of the switches sw is closed and opened to adjust in steps the resistance of each of the resistors R3 and R4 and the voltage (more specifically, the resistance) of the voltage adjustment circuit 17.

The amplification circuit unit 22 performs digital and analog correction on the output of the sensor 1 based on the operation of the control circuit 24. The amplification circuit unit 22 amplifies the output of the sensor 1 and generates the output signal Vout, which is not dependent on the temperature. That is, the amplification circuit 22 performs digital correction and analog correction to correct temperature dependency in each of the sensor and the amplification circuit unit 22.

The control circuit 24 is connected to a temperature sensor 12 and a memory device 25. The temperature sensor 12 detects the ambient temperature. As shown in FIG. 7, the memory device 25 stores correction data segments D0 to Dn respectively corresponding to a plurality of correction points set at, for example, 10° C. intervals. The resistances of the feedback resistors R1$a$, R1$b$, and R2 and the voltage adjustment circuit 9 are corrected based on the correction data segments D0 to Dn.

The control circuit 24 reads the correction data corresponding to a correction point from the memory device 25 based on a detection signal of the temperature sensor 12. The memory device 13$a$ converts the correction data into predetermined control data and stores the control data in a data latch unit 26. In this manner, the amplification circuit unit 4 adjusts the resistances of the feedback resistors R1$a$, R1$b$, and R2 at each correction point with the control data stored in the data latch unit 26.

Figure 8:
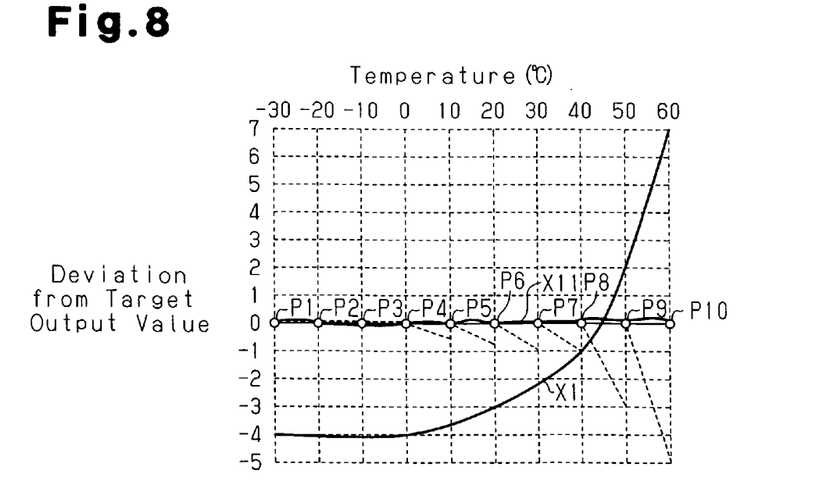
FIG. 8 is a graph schematically showing the output characteristic of the sensor amplification circuit of FIG. 6.
Figure 9:
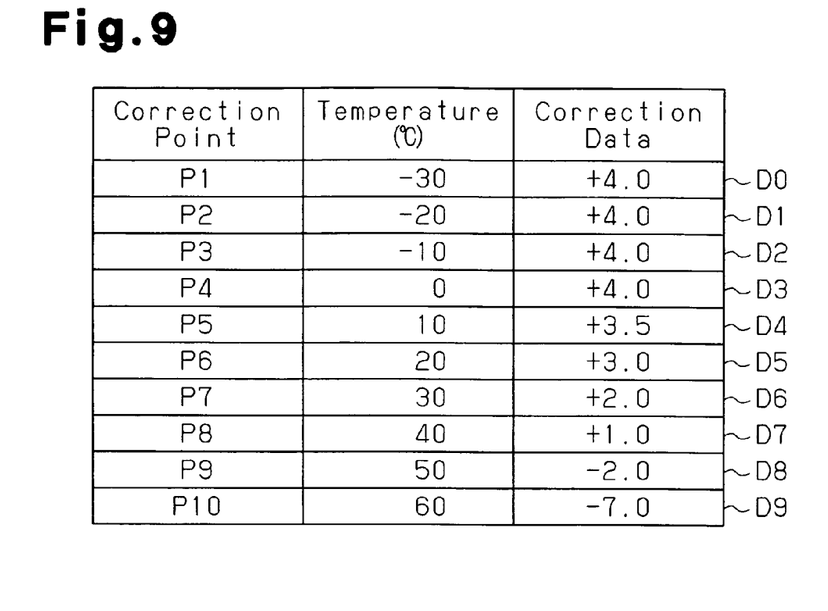
FIG. 9 is a table showing the correction data stored in a memory device shown in FIG. 7.

FIG. 9 shows some of the control data segments D0 to Dn stored in the memory device 25 of FIG. 7. The correction data segments D0 to D9 shown in FIG. 9 are stored at predetermined addresses in the memory device 25. The correction data segments D0 to D9 are used for digital correction at correction points P1 to P10, which are set at 10° C. intervals with respect to the characteristic curve X1 shown in FIG. 8. The characteristic curve X1 shows the output signal Vout of the amplification circuit unit 22 when the output of the sensor 1 is not corrected. The amplification circuit unit 22 corrects the output of the sensor with the correction data segments D0 to D9 in correspondence with the correction points P1 to P10. As a result, the characteristic curve X1 is converged to the target value (zero in FIG. 8) regardless of the temperature. For example, the amplification circuit unit 22 uses the correction data segment D0 corresponding to the correction point P1 to adjust the resistances of the resistors R1$a$, R1$b$, and R2 and the voltage adjustment circuit 9. As a result, +4 is added to the value for the characteristic curve X1 at correction point P1.

The control circuit 24 is connected to a gradient calculation circuit 27. Based on the correction data for each correction point, the gradient calculation circuit 27 calculates gradient data for performing analog correction on the output of the sensor 1 between correction points and provides the gradient data to the data latch unit 26. Based on the gradient data stored in the data latch unit 26, the amplification circuit unit 22 adjusts the resistances of the resistors R3 and R4 and the voltage adjustment circuit 17 between the correction points.

Figure 10:
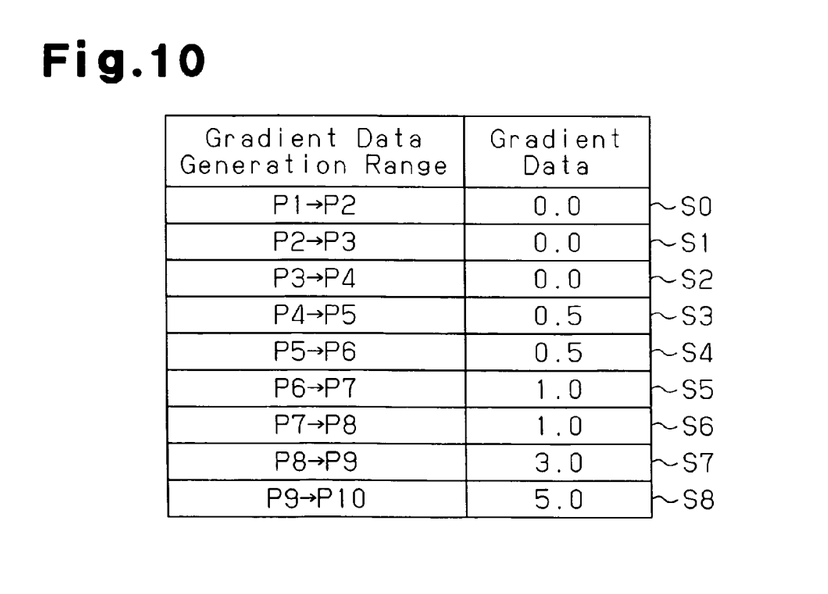
FIG. 10 is a table showing gradient data calculated by a gradient calculation circuit shown in FIG. 7.

FIG. 10 shows gradient data segments S0 to S8 calculated from the correction data segments D0 to D9 shown in FIG. 9. The gradient data segments S0 to S8 are calculated from the difference between the correction data segments D0 to D9. The resistances of the resistors R3 and R4 and the voltage adjustment circuit 17 are adjusted based on the gradient data segments S0 to S8 at the temperatures between the correction points P1 to P10. To change the direction of gradient, the switch circuit 16 changes the gradient direction.

FIG. 8 is a graph schematically showing the output characteristic of the sensor amplification circuit 21 shown in FIG. 6. The characteristic curve X1 prior to correction is temperature dependent and has an output level that increases as the temperature rises.

As shown in FIG. 8, the characteristic curve X1 shows the output characteristic of the sensor amplification circuit after correction by the amplification circuit unit 22. At each of the correction points P1 to P0, the control circuit 24 reads the correction data corresponding to the temperature from the memory device 25 to adjust the resistances of the resistors R1$a$, R1$b$, and R2 and the voltage adjustment circuit 9.

In this manner, the digital correction circuit 18 functions to correct the characteristic curve X1 to the target value (the level of zero in FIG. 8) at each of the correction points P1 to P10.

The characteristic curve X1 is corrected based on the gradient data segments S0 to S8 calculated by the gradient calculation circuit 27 at the temperatures between the correction points P1 to P10. For example, at temperatures between the correction points P6 and P7, the gradient data segment S5 is calculated so as to offset the gradient of the characteristic curve X1 based on the correction data segments D5 and D6. The resistances of the resistors R3 and R4 and the voltage adjustment circuit 17 are adjusted based on the gradient data segment S5. In FIG. 8, the gradients shown by the broken lines represent the gradient of the output voltage Va of the analog correction amplifier 15 adjusted based on the gradient data segments S0 to S8.

In this manner, the analog correction circuit 19 performs corrections so that the characteristic curve X1 approaches the predetermined target value at temperatures between the correction points P1 to P10.

Accordingly, the temperature dependency of the characteristic curve X1 is eliminated. That is, the characteristic curve X1 is corrected to the characteristic curve X1, which is flat and generally approximated to the target value.

The sensor amplification circuit 21 of the first embodiment has the advantages described below.

(1) The amplification circuit 22 corrects the output of the sensor 1, which is temperature dependent, by performing digital correction and analog correction. As a result, the characteristic curve X1 is corrected to the characteristic curve X1, which is not temperature dependent.

(2) The amplification circuit unit 22 performs digital correction at the correction points P1 to P10 and analog correction between the correction points P1 to P10. As a result, the characteristic curve X11 after the correction is flat and extends generally along the target value.

(3) The amplification circuit unit 22 performs analog correction between the correction points P1 to P10. Thus, the digital correction prevents the number of correction points from increasing. This reduces the number of times correction data is read from the memory device 25. Further, the number of times the digital correction circuit 18 changes the resistance is prevented from increasing. This reduces power supply noise and power consumption.

Figure 12:
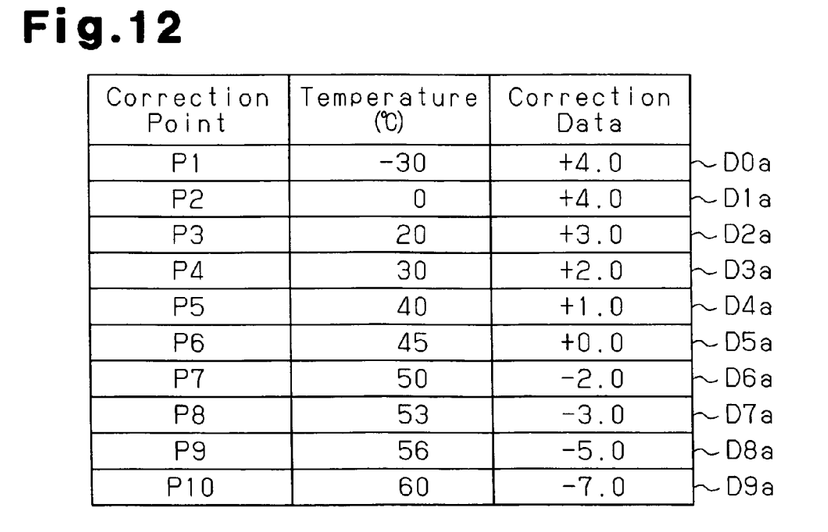
FIG. 12 is a table showing the correction data used at each correction point of FIG. 11.
Figure 13:
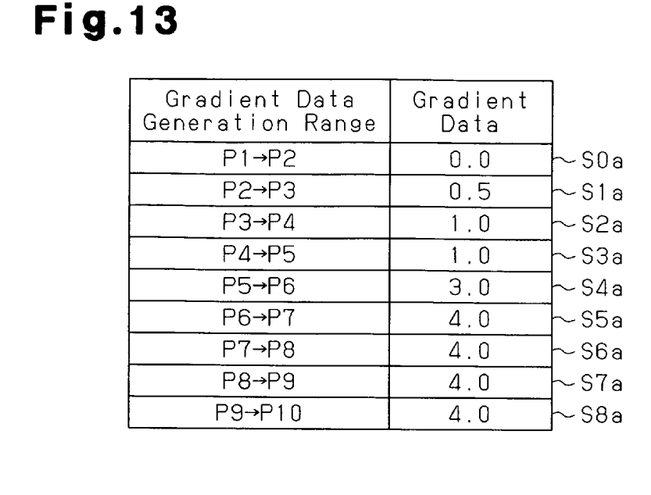
FIG. 13 is a table showing the gradient data used at each correction point of FIG. 11.

A second embodiment of the present invention will now be discussed with reference to FIGS. 11 to 13. In the second embodiment, the temperature intervals between the correction points P0 to P10 are changed in accordance with the characteristic curve X1.

Figure 11:
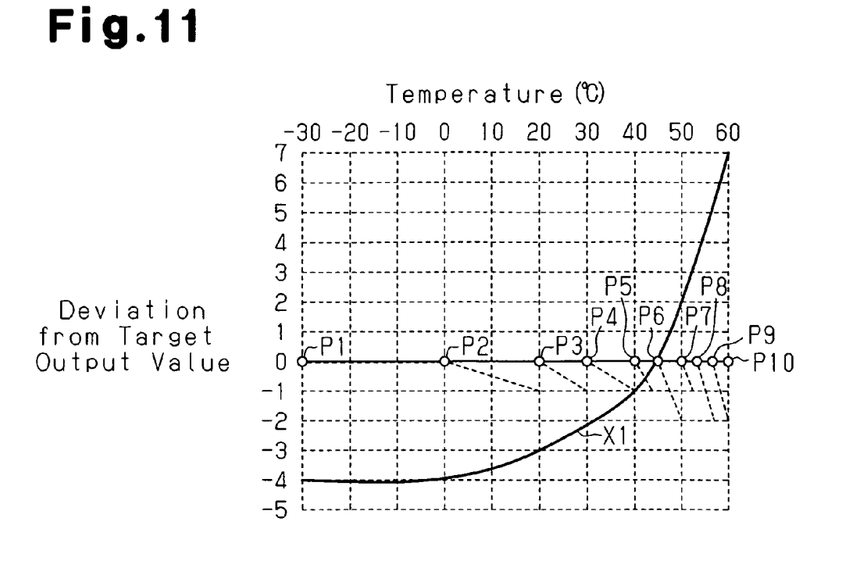
FIG. 11 is a graph obtained through a correction process according to a second embodiment of the present invention.

As shown in FIG. 11, the temperature interval between the correction points P1 to P10 is narrowed as the gradient of the characteristic curve X1 becomes steep. As shown in FIG. 12, the memory device 25 stores correction data segments D0a, D1a, D2a, D3a, D4a, D5a, D6a, D7a, D8a, and D9a, which respectively correspond to the correction points P1 to P10. FIG. 13 shows gradient data segments S0a, S1a, S2a, S3a, S4a, S5a, S6a, S7a, and S8a for between the correction points P1 to P10 from the correction data of FIG. 12.

In the same manner as in the first embodiment, the digital correction circuit 18 corrects the characteristic curve X1 to the predetermined target value at the correction points P1 to P10. The analog correction circuit 19 corrects the characteristic curve X1 based on the gradient data (FIG. 12) calculated by the gradient calculation circuit 27 at temperatures between the correction points P1 to P10.

In the second embodiment, the analog correction is further optimized from the first embodiment. More specifically, the temperature intervals between the correction points P1 to P10 are changed in accordance with the gradient of the characteristic curve X1. This improves the accuracy of the gradient data (FIG. 12). Accordingly, the characteristic curve X1 between the correction points P1 to P10 is corrected to further become closer to the predetermined target value.

Figure 14:
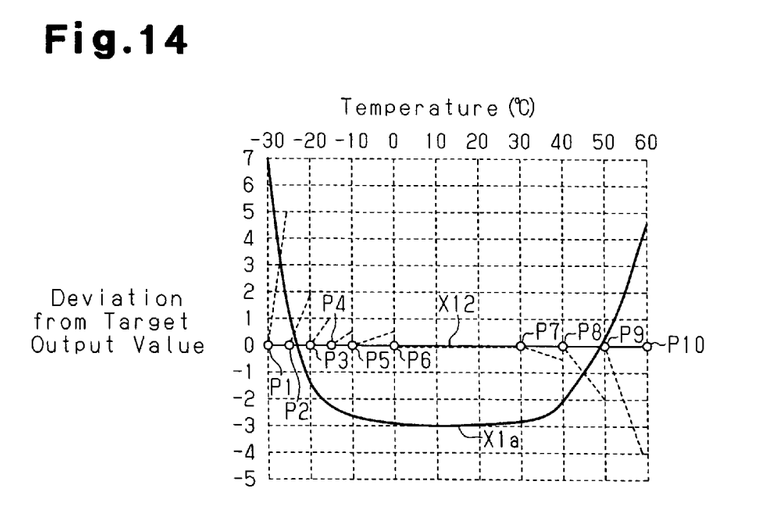
FIG. 14 is a graph obtained through a correction process according to a third embodiment of the present invention.

A third embodiment of the present invention will now be described with reference to FIG. 14. In the third embodiment, as shown in FIG. 14, the characteristic curve X1a has a large gradient in a low temperature region (−30° C. through 60° C.) and a high temperature region (30° C. through 60° C.). The temperature interval is narrowed between the correction points P1 to P6 in the low temperature region. The temperature interval is also narrowed between the correction points P7 to P10 in the high temperature region. The memory device 25 stores the correction data (not shown) corresponding to the correction points P1 to P10.

In the same manner as in the first embodiment, the characteristic curve X1a is corrected to the predetermined target value by the digital correction circuit 18. At temperatures between the correction points P1 to P10, the characteristic curve X1a is corrected by the analog correction circuit 10 based on the inclination data (not shown) calculated by the gradient calculation circuit 27.

In the same manner as in the second embodiment, the analog correction is optimized in the third embodiment. That is, the temperature intervals between the correction points P1 to P10 are changed in accordance with the gradient of the characteristic curve X1a shown in FIG. 14. This improves the accuracy of the gradient data. Accordingly, the characteristic curve X12 after correction is even flatter.

A fourth embodiment of the present invention will now be discussed with reference to FIGS. 15 and 16. In the fourth embodiment, the control circuit 24 determines whether or not correction with the correction data must be performed based on the correction data read from the memory device 25 at each correction point. That is, based on the correction data, the control circuit 24 determines whether or not resistance adjustment must be performed by the digital correction circuit 18 and the analog correction circuit 19 based on the correction data. Resistance adjustment is not performed when it is not necessary.

Figure 15:
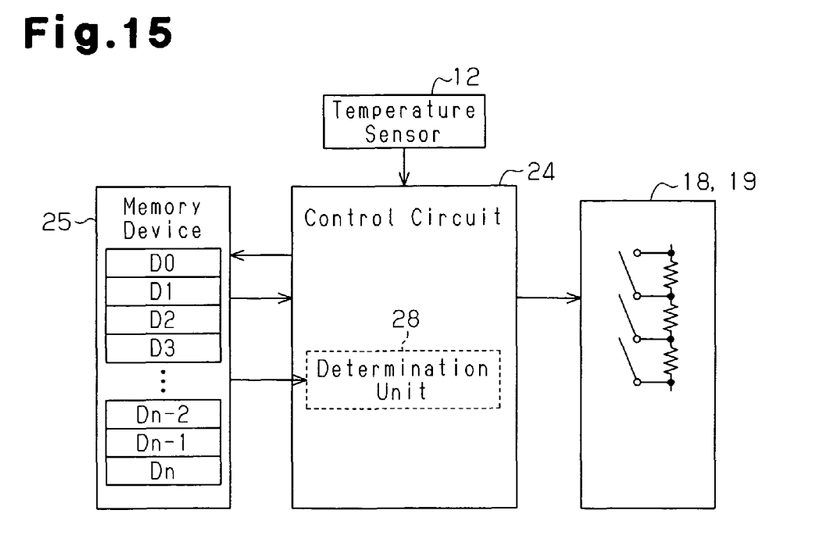
FIG. 15 is a schematic block diagram showing a control circuit of a sensor amplification circuit according to a fourth embodiment of the present invention.

As shown in FIG. 15, the control circuit 24 of the fourth embodiment includes a determination unit 28 for determining whether or not resistance adjustment is necessary in the digital correction circuit 18 and the analog correction circuit 19.

Figure 16:
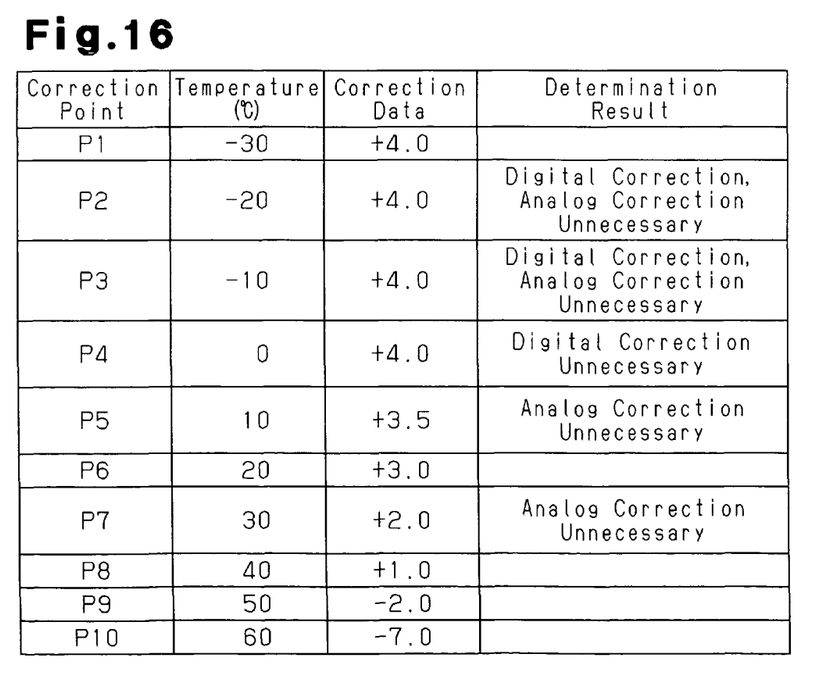
FIG. 16 is a table used by a determination unit shown in FIG. 15 in a determination process.

Referring to FIG. 16, the memory device 25 stores correction data segments D0 to D9 (FIG. 9) respectively corresponding to the correction points P1 to P10 of the characteristic curve X1 (FIG. 8).

At the correction point P1, the correction data segment D0 is read from the memory device 25 and the resistance of the digital correction circuit 18 is adjusted based on the correction data segment D0. As a result, the characteristic curve X1 at the correction point P1 is corrected to the target value. In this case, in the temperatures between the correction points P1 and P2, the resistance of the analog correction circuit 19 is adjusted based on the gradient data S0 calculated from the correction data segments D0 and D1 for the correction points P1 and P2. As a result, the characteristic curve X1 is corrected to the target value between the correction points P1 and P2.

In the correction point P2, the correction data segment D1 is identical to the correction data segment D0 for the correction point P1. Thus, the determination unit 28 determines that the resistance of the digital correction circuit 18 at the correction point P2 is not necessary. Accordingly, the resistance adjustment of the digital correction circuit 18 is not performed. Thus, the resistance of the analog correction circuit 19 between the correction points P2 and P3 is not adjusted.

The correction data segment D2 for correction point P3 is identical to the correction data segment D1 of the correction point P2. Thus, the resistance of the digital correction circuit 18 is not adjusted. In this state, at the temperatures between the correction points P3 and P4, the correction data segments D2 and D3 for the correction points P3 and P4 are identical. Thus, the resistance of the analog correction circuit 19 is not adjusted.

At the correction point P4, the correction data segment D3 is identical to the correction data segment D2 for the correction point P3. Thus, the resistance of the digital correction circuit 18 is not adjusted. In this state, at the temperatures between the correction points P4 and P5, the gradient data segment S3 differs from the gradient data segment S2 between the correction points P3 and P4. Thus, the resistance of the analog correction circuit 19 is adjusted based on the gradient data segment s3.

At the correction point P5, the correction data segment D4 differs from the correction data segment D3 for the correction point P4. Thus, the resistance of the digital correction circuit 18 is adjusted. In this state, the gradient data segment S4 is identical to the gradient data segment S3 between the correction points P4 and P5 for the temperatures between the correction points P5 and P6. Thus, the resistance of the analog correction circuit 19 is not adjusted.

In this manner, the determination unit 28 determines whether or not resistance adjustment of the digital correction circuit 18 or the analog correction circuit 19 is necessary based on the correction data for the correction points P1 to P10.

When resistance adjustment is not necessary, the resistance of the digital correction circuit 18 or the analog correction circuit 19 is not adjusted.

In addition to the advantages of the first embodiment, the fourth embodiment has the advantages described below.

(1) When the correction data segments D0 to D9 for correction points P1 to P10 are identical to the correction data segment for the adjacent correction point, the resistance adjustment of the digital correction circuit 18 is not performed. This reduces the number of times the resistance of the digital correction circuit 18 is adjusted. As a result, power supply noise caused by the resistance adjustment is suppressed. This reduces power consumption.

(2) When the gradient data segments S0 to S8 for between the correction points P1 to P10 are identical to the gradient data between adjacent correction points, the resistance adjustment of the analog correction circuit 19 is not performed. This reduces the number of times the resistance of the analog correction circuit 19 is adjusted. As a result, power supply noise caused by the resistance adjustment is suppressed. This reduces power consumption.

A fifth embodiment of the present invention will now be discussed with reference to FIG. 17. In the fifth embodiment, the necessity for resistance adjustment at the correction points P1 to P10, that is, the temperature for reading correction data from the memory device 25 is determined beforehand.

Figure 17:
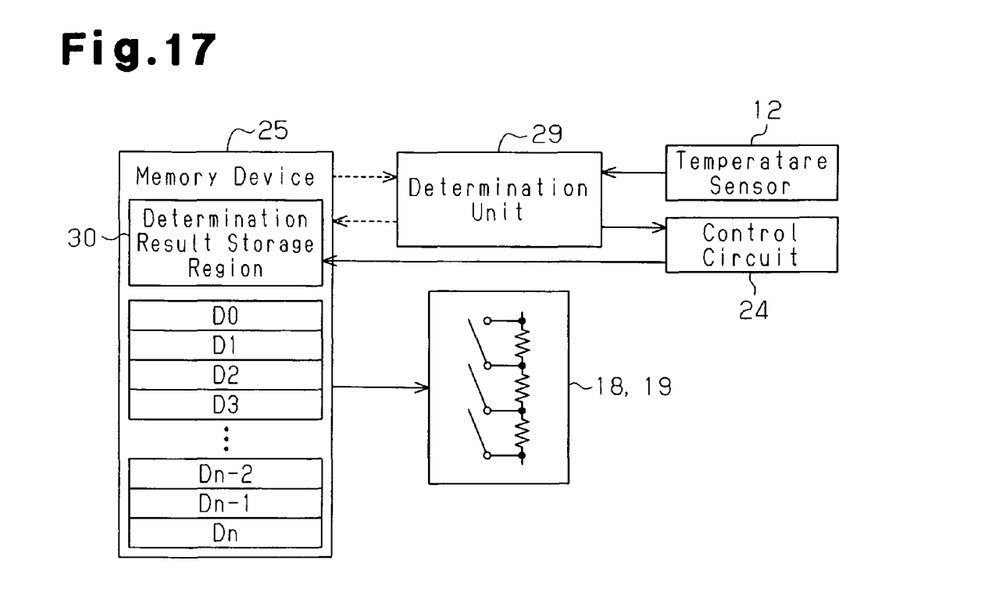
FIG. 17 is a schematic block diagram showing a control circuit according to a fifth embodiment of the present invention.

Referring to FIG. 17, a determination unit 29 reads all of the correction data stored in the memory device 25 and determines beforehand the temperature of the correction point requiring resistance adjustment (temperature for changing correction data) of the digital correction circuit 18 or the analog correction circuit 19. The determination unit 29 stores the determination result in a determination result storage region 30 of the memory device 25.

Then, based on the determination result stored in the determination result storage region 30, the determination unit 29 determines whether resistance adjustment is necessary for the digital correction circuit 18 or the analog correction circuit 19 at correction points P1 to P10. As a result, the control circuit 24 reads the correction data from the memory device 25 only when detecting temperatures corresponding to the one of the correction points P1 to P10 requiring resistance adjustment.

Accordingly, in the fifth embodiment, the number of times correction data is read from the memory device 25 is reduced. This suppresses power supply noise and reduces power consumption.

It should be apparent to those skilled in the art that the present invention may be embodied in many other specific forms without departing from the spirit or scope of the invention. Particularly, it should be understood that the present invention may be embodied in the following forms.

A control signal corresponding to the determination result of the determination unit 28 in the fourth embodiment or the determination unit 29 in the fifth embodiment may be provided from outside the amplification circuit 21.

In the fifth embodiment, the determination unit 29 may incorporate the control circuit 24.

The present examples and embodiments are to be considered as illustrative and not restrictive, and the invention is not to be limited to the details given herein, but may be modified within the scope and equivalence of the appended claims.

What is claimed is:

1. A method for correcting an input signal having a temperature dependent characteristic, the method comprising:
    setting correction data for each of a plurality of correction points set at a predetermined temperature interval;
    generating an output signal having a predetermined characteristic curve by amplifying the input signal;
    performing a first correction for correcting the input signal with the correction data to change the characteristic curve of the output signal;
    calculating gradient data between two of the correction points that are adjacent to each other from the correction data for each of the two adjacent correction points; and
    performing a second correction for correcting the input signal with the gradient data to change the characteristic curve of the output signal.

2. The method according to claim 1, wherein said setting the correction data includes changing the predetermined temperature interval between the two adjacent correction points in accordance with the temperature dependency characteristic of the input signal.

3. The method according to claim 1, further comprising:
    comparing the correction data for a given correction point with the correction data for at least one of two correction points adjacent to the given correction point;
    repeating said comparing for each correction point; and
    determining whether the first correction or the second correction is necessary based on the comparison.

4. The method according to claim 1, further comprising:
    comparing the correction data for each of the correction points with the correction data for each of two correction points adjacent to that correction point and determining whether the first correction or the second correction is necessary for each correction point based on the comparison; and
    performing the first correction or the second correction based on the determination.

5. The method according to claim 1,
wherein said performing a first correction includes changing the characteristic curve of the output signal by correcting the input signal based on the correction data so that the characteristic curve converges to a predetermined target value regardless of temperature; and
wherein said performing a second correction includes changing the characteristic curve of the output signal by correcting the input signal based on the gradient data so that the characteristic curve converges to a predetermined target value regardless of temperature.

6. A correction circuit for correcting an input signal having a temperature dependent characteristic, the correction circuit comprising:
a memory device for storing correction data for each of a plurality of correction points set at a predetermined temperature interval;
a first correction circuit for correcting the input signal at each correction point based on the correction data corresponding to each correction point;
a second correction circuit for correcting the input signal between two of the correction points that are adjacent to each other based on gradient data calculated from the correction data for each of the two adjacent correction points;
a sensor for detecting temperature;
a control circuit for reading the correction data corresponding to the temperature detected by the temperature sensor from the memory device and controlling operation of the first correction circuit and the second correction circuit based on the correction data; and
an amplification circuit unit, including the first correction circuit and the second correction circuit, for correcting the input signal with the first correction circuit and the second correction circuit to generate an output signal having a predetermined characteristic curve.

7. The correction circuit according to claim 6, wherein the predetermined temperature interval between the two adjacent correction points is changed in accordance with the temperature dependency characteristic of the input signal.

8. The correction circuit according to claim 6, wherein the control circuit includes:
a determination unit for comparing the correction data for a given correction point with the correction data for at least one of two correction points adjacent to the given correction point and for determining whether correction with the first correction circuit or the second correction circuit is necessary based on the comparison, wherein the determination unit repeats said comparing for each correction point.

9. The correction circuit according to claim 6, further comprising:
a determination unit for comparing the correction data for each of the correction points with the correction data for each of two correction points adjacent to that correction point, determining whether correction with the first correction circuit or the second correction circuit is necessary for each correction point based on the comparison, and storing the determination in the memory device; and
wherein the control circuit controls operation of the first correction circuit and second correction circuit based on the determination.

10. The correction circuit according to claim 6,
wherein the first correction circuit adjusts gain and offset voltage of the amplification circuit unit based on the correction data so that the characteristic curve of the output signal converges to a predetermined target value regardless of the temperature; and
wherein the second correction circuit adjusts the gain and the offset voltage of the amplification circuit unit based on the gradient data so that the characteristic curve of the output signal converges to a predetermined target value regardless of the temperature.

11. The correction circuit according to claim 6, wherein the correction circuit is connected to a sensor and receives an output signal of the sensor as the input signal.

* * * * *